United States Patent
Kravitz

(10) Patent No.: US 7,839,664 B2
(45) Date of Patent: Nov. 23, 2010

(54) AC TO DC POWER SUPPLY HAVING ZERO FREQUENCY HARMONIC CONTENTS IN 3-PHASE POWER-FACTOR-CORRECTED OUTPUT RIPPLE

(75) Inventor: David Kravitz, Remsenburg, NY (US)

(73) Assignee: Switching Power, Inc., Ronkonkoma, NY (US)

( * ) Notice: Subject to any disclaimer, the term of this patent is extended or adjusted under 35 U.S.C. 154(b) by 209 days.

(21) Appl. No.: 12/001,714

(22) Filed: Dec. 11, 2007

(65) Prior Publication Data

US 2009/0154203 A1    Jun. 18, 2009

(51) Int. Cl.
*H02M 1/14* (2006.01)
*H02J 1/02* (2006.01)

(52) U.S. Cl. .......................... 363/45; 363/67

(58) Field of Classification Search .................. 363/39, 363/44, 45, 46, 50, 52, 56.05, 56.11, 89, 363/125, 65, 67, 81; 323/207
See application file for complete search history.

(56) References Cited

U.S. PATENT DOCUMENTS

| | | | | |
|---|---|---|---|---|
| 4,641,229 A | * | 2/1987 | Easter | 363/21.18 |
| 5,311,419 A | | 5/1994 | Shires | |
| 5,321,600 A | * | 6/1994 | Fierheller | 363/65 |
| 6,297,976 B1 | * | 10/2001 | Isono | 363/65 |
| 6,608,769 B2 | * | 8/2003 | Bergk | 363/21.12 |
| 6,621,721 B2 | * | 9/2003 | York | 363/65 |

* cited by examiner

*Primary Examiner*—Gary L Laxton
(74) *Attorney, Agent, or Firm*—Scully, Scott, Murphy & Presser, P.C.

(57) ABSTRACT

An AC-DC power supply circuit utilizing an output stage configuration designed to achieve no output ripple at the power line frequency. To eliminate the ripple formed, each separate processing output stage corresponding to a respective ac voltage source phase which provides a 120 Hz ripple, is stacked, in a series connection, and due to their respective ripple phase shifts of 120° degrees, achieves ripple cancellation at the output.

10 Claims, 2 Drawing Sheets

AC TO DC POWER SUPPLY HAVING ZERO FREQUENCY HARMONIC CONTENTS IN 3-PHASE POWER-FACTOR-CORRECTED OUTPUT RIPPLE

FIELD OF THE INVENTION

The present invention relates to dc power supplies in general, and particularly, an AC to DC power supply and method for producing a dc voltage output having no low-frequency harmonic output ripple.

BACKGROUND OF THE INVENTION

FIG. 1 depicts a known prior art power supply circuit 10 that includes 3-phase active power factor correction. As shown in FIG. 1, a 3-phase AC line voltage source 12 provided as shown in a Y-configuration, however, it is understood that other configurations are possible, e.g., a delta configuration 3-phase AC power supply source, either with or without a Neutral line, designated as "N" in FIG. 1. Moreover, in one example, such a 3-phase AC line source provides approximately 60 Hz, 120 Volts at 3 phase inputs $\phi_1$, $\phi_2$, $\phi_3$, each about 120° degrees apart. Due to it being a 3-phase system there is at the output a 6 times the input frequency ripple. Therefore, with a sixty Hz input, the output ripple is 360 Hz.

Further to the circuit of FIG. 1, the known prior art power supply circuit 10 depicted includes, for each phase of the 3-phase source voltage, a power factor correction, isolation and output circuitry for generating a DC voltage. For illustrative purposes, only one power factor correction, isolation and output circuitry for generating a DC voltage corresponding to the phase $\phi_1$ input, is shown. In FIG. 1, the power factor correction circuit portion 50 includes an emi (electromagnetic interference) filter 15 which receives the $\phi_1$ phase input (e.g., 60 Hz, 120 V) and which is coupled to an input rectifier device 25. The rectified AC voltage is then input to a boost regulator device 30 (e.g., rated at 380 V) that provides an output signal to a bulk capacitor device 35 which also carries an output 120 Hz ripple. It is understood that the processing at each stage forms a dc voltage output having the 120 Hz ripple. Feedback signal 42 from the bulk capacitor is input to a power factor controller, which in one embodiment may be power factor controller IC UC 3854 (manufactured by Texas Instruments Corp.) to result in a reduced input current THD (harmonic distortion) by controlling output gain of the boost regulator 30 delivering voltage to the capacitor node 35. The output of the capacitor node 40 is input to a half bridge buck regulator device 60 for AC-DC isolation. The dc output signal 40, including the 120 Hz voltage ripple, is further rectified by an output rectifier/LC filter device 65, e.g., having a 120 V rated capacitor. Provided as part of this output circuitry is a pulse width modulating regulator device 70 that controls the output voltage. In one embodiment, the pulse width modulating regulator is a 3525A (e.g., manufactured by Fairchild Semiconductor Corp.) The isolation device 60 and further filter/regulator device 70 cooperate to produce a dc output signal 80 (e.g., 92V DC output) having a small ripple, each ripple voltage 120° phase shifted from the next. The output of a single stage, thus, in the example embodiment described, is a 92V/20 A DC power supply having a 120 Hz ripple. While the filter/regulator device 70 attenuates the amount of ripple (70 mv peak-to-peak for a 92 dc V output example as shown) found at the bulk capacitor node considerably, no technique exists for completely eliminating the ripple voltage.

There are many architectures that could take a 3-phase input to generate up to 275 DC voltage output, however, while these are sophisticated approaches, including the use of digital signal processing, none of these embodiments provide a technique for completely eliminating the low frequency harmonic ripple voltage from a dc voltage produced by a 3-phase ac voltage source.

It would be highly desirable to provide an AC-DC power supply circuit utilizing an output stage configuration designed to achieve no discernable low frequency harmonic output ripple.

SUMMARY OF THE INVENTION

It is thus an object of the present invention to provide an AC-DC power supply circuit utilizing an output stage configuration designed to achieve no output ripple at the power line frequency.

In a preferred embodiment, in a 3-Phase AC voltage source to eliminate the ripple, each separate phase is which provides a 120 Hz ripple, is stacked in a series connection, and due to their respective phase shifts, of 120° degrees, achieves ripple cancellation at the output.

In the preferred embodiment, the output voltage ripple at 360 Hz is zero if the input source is balanced.

Thus, according to the principles of the invention, there is provided an AC-DC power supply comprising:

a 3-phase AC voltage source providing balanced 120° phase-shifted input voltage signals;

an active power-factor corrected (PFC) circuit associated with each phase, each PFC circuit receiving a respective AC input voltage signal of a respective phase and providing respective DC signal carrying a ripple voltage of a respective phase;

an output filter circuit for attenuating the ripple voltage of the respective phase;

an isolation circuit coupling the PFC output DC voltage to each respective output filter and ripple voltage of the respective phase;

the output filters of each phase forming a stacked series connection, wherein each isolated DC output voltage being added together to form the output DC signal and each ripple of each respective phase are added together and cancelled such that the ripple voltage at the power line frequency is eliminated.

Thus, advantageously, the invention provides a stacked series connection of the output stages of each PFC corrected AC-DC output receiving a balanced 3-phase, 120° phase-shifted input voltage exhibiting no discernable ripple at the power line frequency.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENT

Figure 2:
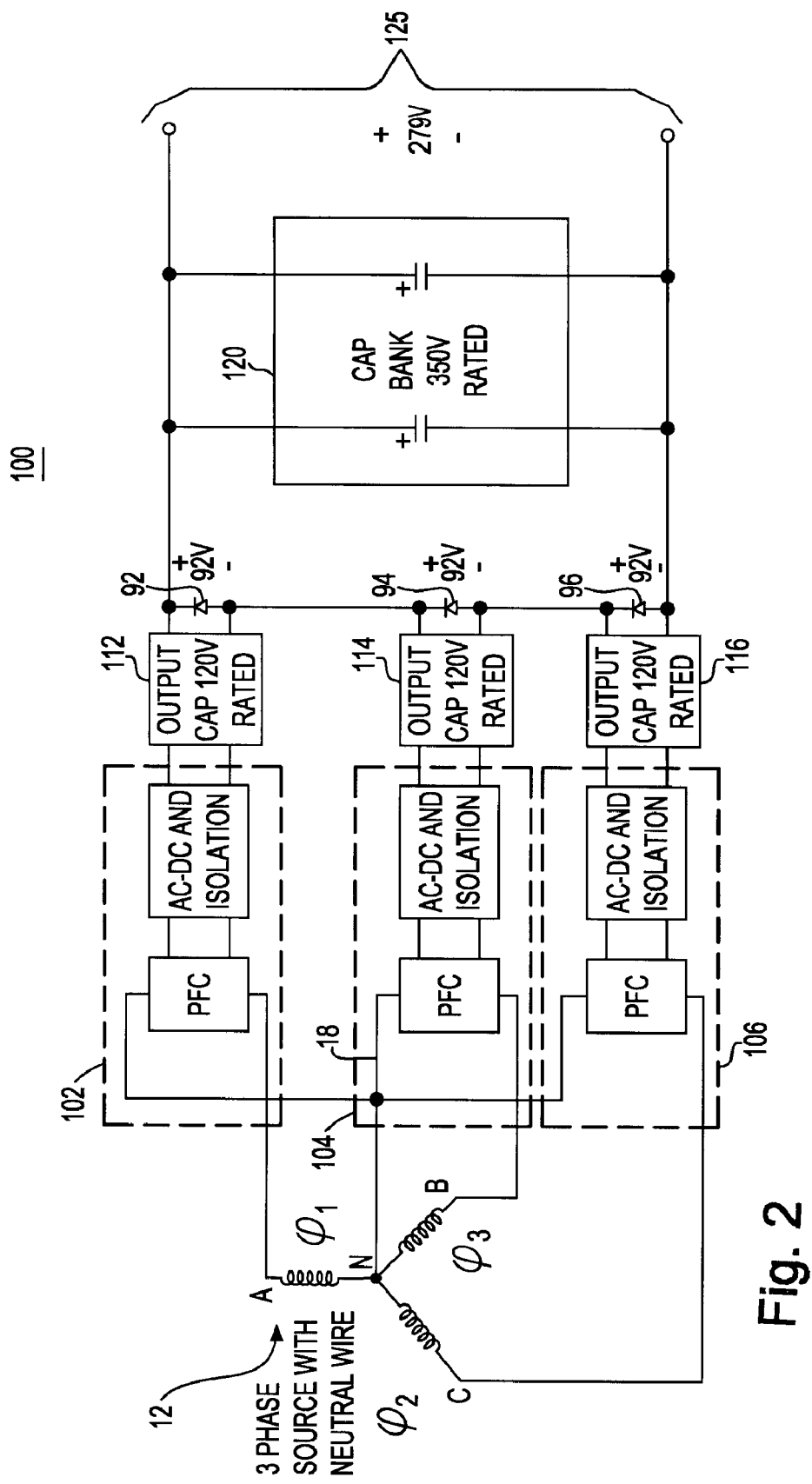

FIG. 2 depicts a generic block diagram 100 of the AC-DC power supply circuit implementing an output stage configuration designed to achieve no output ripple, and particularly, one that exhibits zero low frequency harmonic content in 3-phase power-factor-corrected output ripple.

The power supply circuit 100 includes three (3) separate single phase active PFC front ends 102, 104, 106 each followed by a respective isolated DC-DC converter for providing a respective isolated DC output signal having a ripple voltage according to the respective phase of the input AC signal to that respective front end. As described in connection with the PFC circuit of FIG. 1, each PFC front end includes an output filter stage 112, 114, 116, such as a regulator, an LC filter, and like equivalent or combination thereof, each providing an isolated DC output signal at a voltage output conductor with respect to a reference output line. For illustrative purposes only, it is assumed that each output phase provides a 92 DC voltage (92V).

As further shown in FIG. 2, connecting each voltage output conductor with a reference output line for each respective phase is a respective reverse voltage protection circuit 92, 94, 96. In one embodiment, each respective reverse voltage protection circuit 92, 94, 96 includes a reverse biased diode, although other equivalent protection devices would be applicable as would be known to skilled artisans. To further clean up the additive dc voltage output signal (e.g., full 275 Vdc in the example embodiment described), a further capacitor bank 120 is provided between the power supply output and the reference output line forming power supply output 125 to help reduce the higher frequency content ripple on the 275 VDC bus, i.e. the switching frequency ripple of the individual PWMs device 70.

As further shown in FIG. 2, by arranging each isolated output in a stacked series arrangement the power line frequency harmonic component of output ripple is eliminated. Thus, in the example shown in FIG. 2, the power supply 100 of the invention creates a 275V (e.g., 92V multiplied by 3) at 20 A isolated output, from a three phase Y input 12. It is understood that the input may be 3-phase Delta input with or without a neutral reference line 18. To produce a 275 voltage output, in one embodiment, the 3-phase ac signal source may comprise a 103 vac to 132 vac, 3-phase at 60 Hz+/−5%; or alternately, a 198 to 242 vac, 3-phase at 50 Hz+/−5%. It is further understood that the three phase input voltage source can be at any input voltage, and any input frequency so long as they are 120 degrees apart and balanced in voltage).

In the embodiment depicted in FIG. 2, the input current loading from any phase will not exceed the average of the currents in all three phases by more than 5%.

Figure 1:
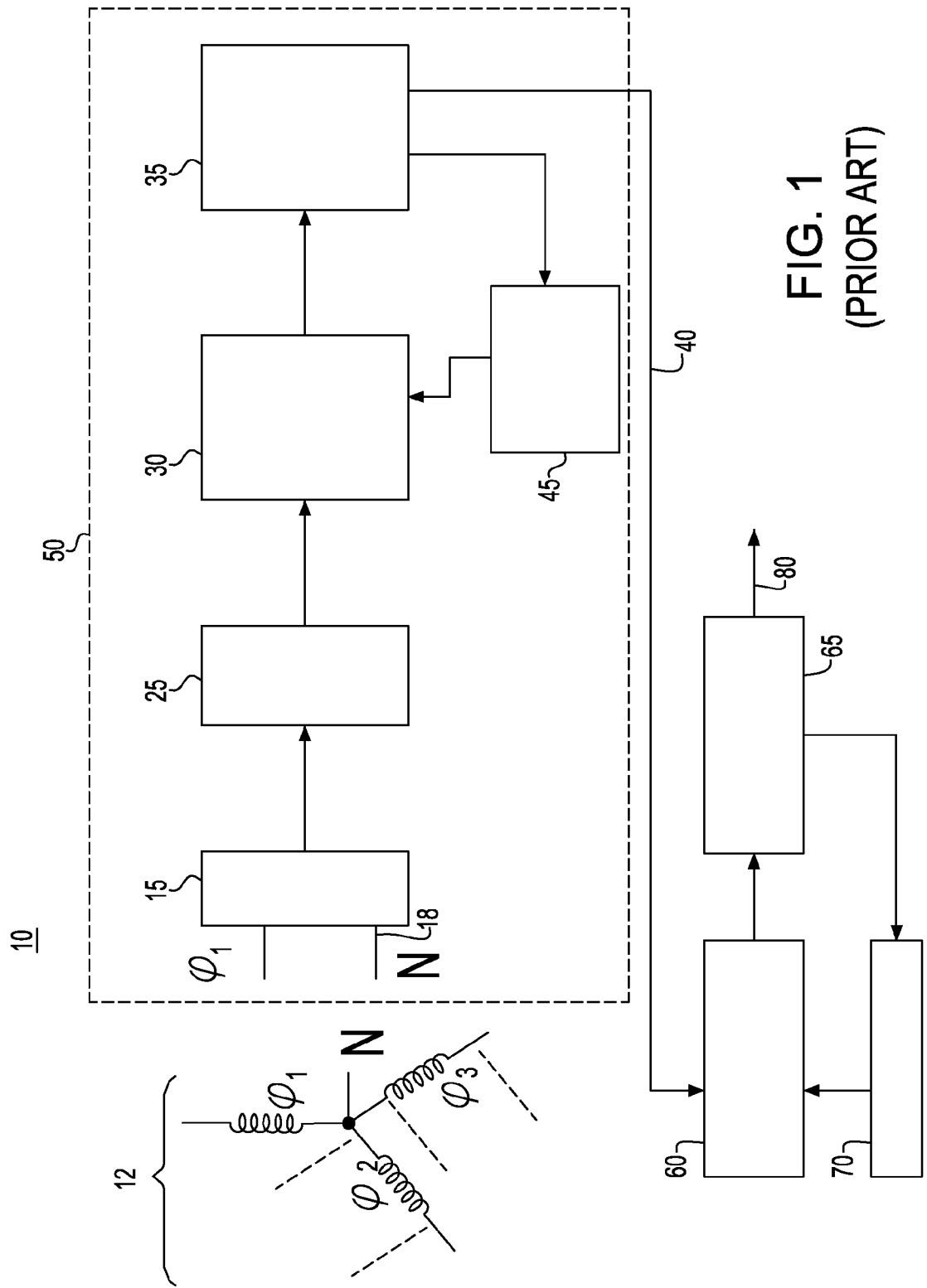
FIG. 1 is a schematic diagram of a typical active PFC front end of a power supply circuit 10 receiving a single phase of a 3-phase power source; and, FIG. 2 is a schematic diagram of the ac-dc power supply according to a preferred embodiment of the present invention.

As mentioned in connection with FIG. 1, for the example embodiment where each phase produces a 92V output, this output comprises approximately 70 mV of 120 Hz ripple. This is due to the large 120 Hz ripple present on each input bulk carrier in the PFC front end.

Provided that all three input phases are balanced, and 120° phase shifted, then each 92V output sees the same 70 mV ripple with a 120°/240° phase shift. That is, as shown in the following representation:

$$Vo(\varphi_1) \text{ripple} = 70 \text{ mV} [\sin(2\pi\, 120)]t$$

$$Vo(\varphi_2) \text{ripple} = 70 \text{ mV} \left[\sin\left[(2\pi\, 120)t + \frac{2\pi}{3}\right]\right]$$

$$Vo(\varphi_3) \text{ripple} = 70 \text{ mV} \left[\sin\left[(2\pi\, 120)t - \frac{2\pi}{3}\right]\right]$$

Using basic trigonometry:

$$\sin(\alpha+\beta) = (\sin\alpha \cdot \cos\beta) + (\cos\alpha \cdot \sin\beta) \text{ and}$$

$$\sin(\alpha-\beta) = (\sin\alpha \cdot \cos\beta) - (\cos\alpha \cdot \sin\beta)$$

Then, at the power supply output having the stacked series connection:

$$Vo(\varphi_1) \text{ripple} + Vo(\varphi_2) \text{ripple} + Vo(\varphi_3) \text{ripple} =$$

$$= 70 \text{ mV} \cdot \sin(2\pi\, 120)t +$$
$$\quad 2 \cdot 70 \text{ mV} \left(\sin[(2\pi\, 120)t] \cdot \cos\left[\frac{2\pi}{3}\right]\right)$$
$$= 70 \text{ mV} \cdot \sin(2\pi\, 120)t +$$
$$\quad 2 \cdot 70 \text{ mV}(\sin[(2\pi\, 120)t] \cdot -0.5)$$
$$= 70 \text{ mV} \cdot \sin(2\pi\, 120)t - 70 \text{ mV} \cdot \sin(2\pi\, 120)t$$
$$= \phi$$

Therefore, there does not exist any 360 Hz ripple on the main output bus (which is 6 times the 60 Hz present at the inputs due to the 3-phase and the fact that ripple is twice the line frequency, e.g., 60 Hz and thus becomes 6·60 Hz=360 Hz). That is, the ripple @ 360 Hz goes to zero.

Since the power line ripple on each output is periodic it can more generally be expressed as a linear combination of harmonically related complex exponentials, i.e. a Fourier Series of the form:

$$E(t) = \sum_{k=-\infty}^{+\infty} a_k e^{jkw_o t}$$

where $w_o = 2\pi f_o$; $f_o = 120$ Hz where E(t) is the output voltage for each phase in the example described herein. As the ripple on each individual output is shifted in phase by 120° ($2\pi/3$), there is obtained:

$$E_A(t) = \sum_{k=-\infty}^{+\infty} a_k e^{jkw_o t}$$

$$E_b(t) = \sum_{k=-\infty}^{+\infty} a_k e^{j[kw_o t + \frac{2\pi}{3}]}$$

$$E_c = \sum_{k=-\infty}^{+\infty} a_k e^{j[kw_o t - \frac{2\pi}{3}]}$$

It is understood that all of the $a_k$ components for $E_A(t)$, $E_B(t)$, $E_C(t)$ are assumed to be the same magnitude, due to equal single phase attenuation. As all three outputs are stacked in series, the overall output ripple is simply the sum of $E_A(t) + E_B(t) + E_C(t)$.

$$E(t) = \sum_{k=-\infty}^{+\infty} a_k e^{jkw_o t} + a_k e^{j(kw_o t + \frac{2\pi}{3})} + a_k e^{j(kw_o t - \frac{2\pi}{3})}$$

$$= \sum_{k=-\infty}^{+\infty} a_k e^{jkw_o t} + a_k e^{jkw_o t} e^{j\frac{2\pi}{3}} + a_k e^{jkw_o t} e^{-j\frac{2\pi}{3}}$$

-continued $$= \sum_{k=-\infty}^{+\infty} a_k e^{jkw_o t}\left[1 + e^{j\frac{2\pi}{3}} + e^{-j\frac{2\pi}{3}}\right]$$

Thus, using Euler's Relation $$e^{jx} = \cos x + j\sin x$$

$$e^{-jx} = \cos x - j\sin x$$

$$= \sum_{k=-\infty}^{+\infty} a_k e^{jkw_o t}\left[1 + \cos\frac{2\pi}{3} + j\sin\frac{2\pi}{3} + \cos\frac{2\pi}{3} - j\sin\frac{2\pi}{3}\right]$$

$$= \sum_{k=-\infty}^{+\infty} a_k e^{jkw_o t}\underbrace{\left[1 + 2\cos\frac{2\pi}{3}\right]}_{0}$$

$$= \phi$$

Therefore, not just the 360 Hz ripple goes to zero but, ALL power line harmonics thereafter as well.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. An AC-DC power supply comprising:
   a 3-phase AC voltage source providing balanced 120° phase-shifted input voltage signals at a power line frequency;
   an active power-factor corrected (PFC) circuit associated with each phase, each PFC circuit receiving a respective AC input voltage signal of a respective phase and providing respective DC signal carrying a ripple voltage of a respective phase;
   a respective output filter circuit for attenuating said ripple voltage of said respective phase;
   an isolation circuit coupling said respective DC signal to each respective output filter and ripple voltage of said respective phase to provide a respective isolated DC output voltage;
   said output filters of each phase forming a stacked series connection, wherein each respective isolated DC output voltage are added together to form an output DC signal and each ripple of each respective phase are added together and cancelled such that said ripple voltage at the power line frequency is eliminated.

2. The AC-DC power supply of claim 1, wherein each said output filter includes:
   a DC voltage line output line and a reference output line; and
   a reverse voltage protection circuit connecting said DC output line with said reference line, wherein an output line of a first of said stacked output filters is coupled to a reference line of a next output filter of said stacked series connection.

3. The AC-DC power supply of claim 2, wherein a reverse voltage protection circuit includes a reverse biased diode device.

4. The AC-DC power supply of claim 1, wherein said input voltage ranges between 103 Vac to 132 Vac.

5. The AC-DC power supply of claim 1, wherein said input voltage is at 60 Hz+/−5%.

6. The AC-DC power supply of claim 1, wherein said input voltage ranges between 198-242 Vac at 50 Hz+/−5%.

7. The AC-DC power supply of claim 1, wherein said 3-phase AC voltage source is a Y-configuration.

8. The AC-DC power supply of claim 1, wherein said 3-phase AC voltage source is a Δ-configuration.

9. The AC-DC power supply of claim 1, wherein said 3-phase AC voltage source is a three phase voltage source having a balanced input and each phase is 120 degrees phase shifted apart.

10. The AC-DC power supply of claim 1, wherein said eliminated ripple voltage at the power line frequency obviates requirement for a large LC output filter to reduce power line frequency ripple voltage.

* * * * *